No. 755,787. PATENTED MAR. 29, 1904.
D. MILLER.
END PLAY DEVICE FOR ROTARY MACHINES.
APPLICATION FILED AUG. 20, 1903.
NO MODEL.

Witnesses
Robt C Chapman
Helen Oxford

Inventor
David Miller
by Albert H. Davis
Att'y

No. 755,787.

Patented March 29, 1904.

UNITED STATES PATENT OFFICE.

DAVID MILLER, OF SCHENECTADY, NEW YORK, ASSIGNOR TO GENERAL ELECTRIC COMPANY, A CORPORATION OF NEW YORK.

END-PLAY DEVICE FOR ROTARY MACHINES.

SPECIFICATION forming part of Letters Patent No. 755,787, dated March 29, 1904.

Application filed August 20, 1903. Serial No. 170,119. (No model.)

*To all whom it may concern:*

Be it known that I, DAVID MILLER, a citizen of the United States, residing at Schenectady, in the county of Schenectady, State of New York, have invented certain new useful Improvements in End-Play Devices for Rotary Machines, of which the following is a specification.

This invention relates to devices for maintaining end play of the shafts of rotary machines, and is especially useful in connection with certain types of electric generators and motors. In such machines difficulty has been found from grooving of the commutator by the brushes, which bear upon the same portion of the commutator-surface continuously and tend to form grooves or tracks. In types of machines driven by belts no such difficulty is experienced, as an end play of the shaft is maintained which prevents the grooving; but in other types of machines not belt-connected—such as rotary converters, motor-generators, and others, where the rotary element is free to obey its own tendency to shift in its bearings—the field-magnet holds the armature in a certain definite position and will groove the commutator under the brush-tread unless special provisions are adopted to prevent it. Various devices have been suggested to avoid this trouble, all of them having provisions for positively maintaining a to-and-fro relative movement of the brushes and shaft, so as to distribute the brush-tread over the surface of the commutator.

My invention relates to the type of such devices covered by a patent issued to Henry Geisenhoner, No. 669,630, dated March 12, 1901, in which the shaft is given an end thrust by an inclined disk, in the face of which is mounted a steel ball adapted to roll in a circular groove around the face of the disk. In the construction shown in this patent when the shaft is drawn back to the normal position in which it would be maintained by the field-magnet of the machine it forms a contact with the ball, rolling the latter around in the circular groove, and by reason of the inclination of the disk giving the shaft a forward thrust against the bias of the field-magnet.

It is the object of my invention to substitute for the ball a rotatable element having a broader bearing-surface less liable to wear and affording a stronger construction. In place of the ball I use a disk mounted on ball-bearings and provided with a rounded boss with which the shaft comes in contact.

Figure 1:
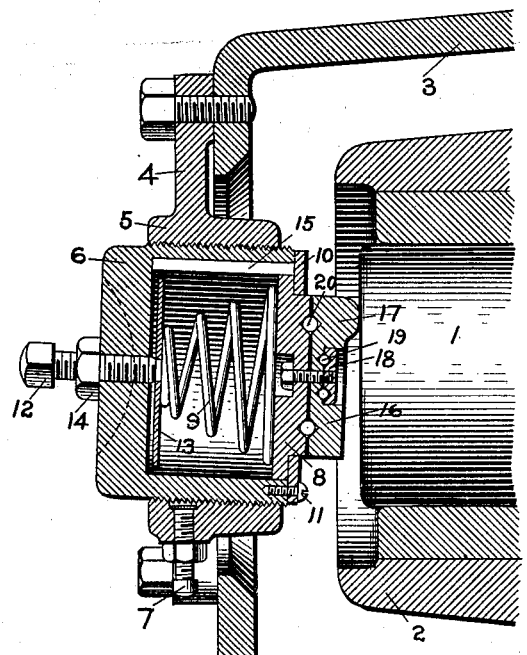
Figure 2:
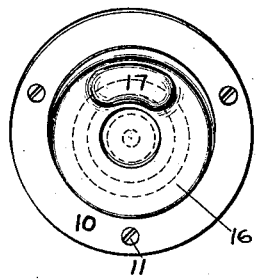
Figure 3:
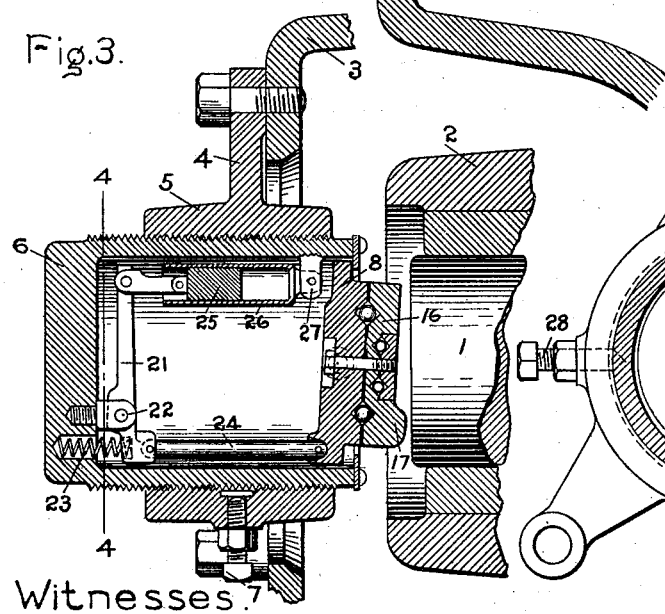
Figure 4:
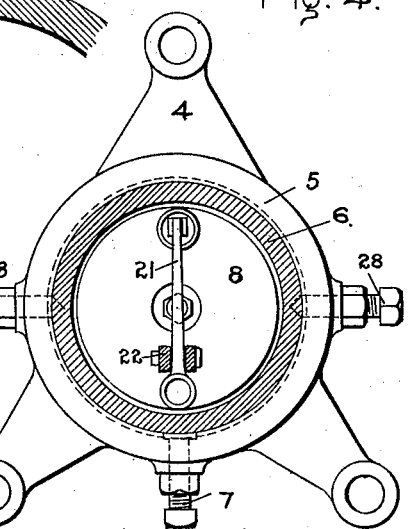

In the accompanying drawings, Figure 1 is a longitudinal vertical section of an end of a shaft and my end-play device. Fig. 2 is a face view of the rotating disk. Fig. 3 is a longitudinal section of a modification; and Fig. 4 is a cross-section thereof on the line 4 4, Fig. 3.

The shaft 1 of the electric machine, which may be any one of the types hereinbefore mentioned, is journaled in a box 2, which is suitably supported in the hollow head of a standard 3. On the end of the standard is secured a yoke 4, having a tubular hub 5 projecting into the head of the standard in line with the shaft. Through the hub passes a cupped holder 6, adjustable lengthwise in the hub, preferably by being screw-threaded and screwed into coöperating screw-threads in the hub. A set-screw 7 locks the holder when adjusted. In the open end of the holder adjacent to the end of the shaft is supported a thrust-plate 8, which is pressed by a spiral spring 9 against a retaining-ring 10, secured to the rim of the holder by screws 11. A screw 12 is tapped through the outer end of the holder and bears against a follower 13, on which the spring abuts. The screw has a lock-nut 14 and serves to adjust the tension of the spring. The plate can move longitudinally in the holder, but cannot rotate therein, owing to a rib 15 engaging a notch in the edge of the plate.

Rotatably mounted on the thrust-plate is a disk 16, having at one point on its face a rounded boss 17. The disk is preferably secured to the plate by a central pivot-bolt 18, under whose flat head may be interposed a set of balls 19, running in registering concentric grooves in the head and the disk. A ball-bearing is preferably interposed also between the disk and the plate, registering concentric grooves being cut in them to form a raceway for the balls 20.

The disk rotates in a plane oblique to the axis of the shaft, the top of the disk standing nearer to the end of the shaft than the bottom. The device operates like the Geisenhoner device, the disk standing normally with the boss 17 at its lowest point. When the shaft comes in contact with the boss, the disk is rotated to the position shown in Fig. 1, thereby causing the shaft to travel endwise in a manner similar to that described in the Geisenhoner patent.

In the modification shown in Fig. 2 I have provided means for causing a less rapid operation of the device in order to prevent too numerous actuations of the shaft within a given time, the device being especially suited for large and heavy machines. I substitute for the spring shown in Fig. 1 certain yielding mechanism, which comprises a retarding device whereby its movements will be slowed down. I have shown in the drawings a lever 21, pivoted at a point near one end in a stationary support 22, secured in the outer end of the holder and having behind its lower shorter end a light spring 23, which tends to keep said lever in a certain normal position. This lower end of the lever is connected with the thrust-plate 8 by means of a rod 24, whose ends are pivoted to the lever and the plate. The upper end of the lever is connected with a piston 25, sliding freely in a cylinder 26, which is pivotally attached to a lug 27 on the inside of the holder 6.

The thrust-plate 8 is supported on horizontal pivots 28, which are preferably pointed screws inserted through the sides of the holder.

The operation of this device is as follows: The parts stand normally with the lower edge of the thrust-plate 8 resting against the retaining-ring 10. When the shaft 1 slides against the boss of the rotating disk, the thrust-plate yields inwardly on its pivots to the position shown in Fig. 3, slightly compressing the spring 23 and forcing the piston 25 into the cylinder 26. The disk immediately begins to revolve with the shaft, and inasmuch as it stands in an oblique position when this movement of rotation begins the result is that the shaft is forced endwise until the boss 17 has risen above the horizontal line of the pivots. After this the thrust-plate 8 yields inwardly above the pivots, and the boss being thus disengaged from the shaft the disk can return to its normal position with the boss at its lowest point. The plate is now in an upright position and will remain so until upon the return of the shaft it is compressed inwardly below the pivots and the operation is repeated. In all of these movements the piston and cylinder act as a dash-pot, and thus retard the movements of the plate, so that the shaft will make a considerable number of rotations between the times when the end-play device is ready to operate. The thrust movements are thus reduced in number and the shaft is less rapidly and positively actuated. This is especially desirable in large and heavy machines in order to prevent a destructive churning of the shaft back and forth.

In accordance with the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. In an end-play device, the combination with an oblique thrust-plate, of a disk rotatably mounted thereon and having a boss.

2. In an end-play device, the combination with an oblique thrust-plate, of a disk rotatably mounted thereon and having a boss, and a ball-bearing between said disk and plate.

3. In an end-play device, the combination with an oblique thrust-plate, of a disk rotatably mounted thereon and having a boss, a pivot-bolt passing centrally through said parts, and a ball-bearing between said disk and the head of said bolt.

4. In an end-play device, the combination with a movable thrust-plate, carrying a rotatable element, of means for retarding the movements of said plate.

5. In an end-play device, the combination with a pivoted thrust-plate carrying a rotatable element, of a dash-pot for retarding the movements of said plate.

6. In an end-play device, the combination with a thrust-plate carrying a rotatable element and pivoted on a diametrical line, of a dash-pot connected to said plate at a point between the pivots.

7. In an end-play device, the combination with a thrust-plate carrying a rotatable element and pivoted on a diametrical line, of a lever, a piston attached thereto, a stationary coöperating cylinder, and connections between said lever and the edge of the plate.

In witness whereof I have hereunto set my hand this 18th day of August, 1903.

DAVID MILLER.

Witnesses:
   BENJAMIN B. HULL,
   MARY EDITH SILLIMAN.